UNITED STATES PATENT OFFICE.

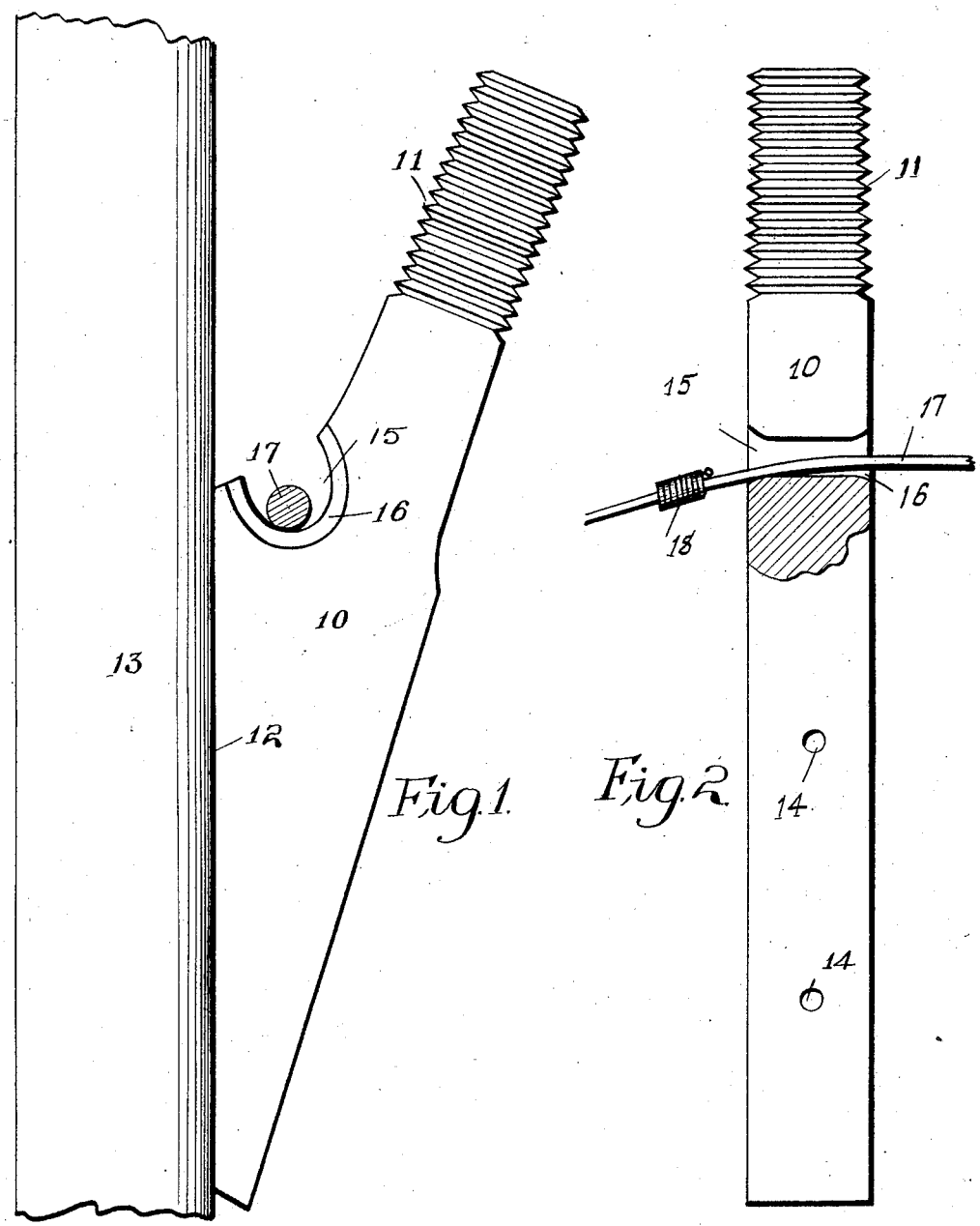

ARIE KLEINHESSELINK, OF ORANGE CITY, IOWA.

BRACKET FOR CURRENT-CONDUCTING WIRES.

1,048,706.  Specification of Letters Patent.  Patented Dec. 31, 1912.

Application filed August 12, 1912. Serial No. 714,736.

*To all whom it may concern:*

Be it known that I, ARIE KLEINHESSE-LINK, a citizen of the United States, residing at Orange City, in the county of Sioux and State of Iowa, have invented a certain new and useful Bracket for Current-Conducting Wires, of which the following is a specification.

The object of my invention is to provide a bracket for current conducting wires of simple, durable and inexpensive construction provided with a notch preferably located between the upper end of the bracket and the support to which the same is secured, which notch is especially formed and designed for permitting a spliced or other wire to slide freely through it.

My invention consists in certain details, in the construction, arrangement and combination of the various parts of the device, whereby the objects contemplated are attained, as hereinafter set forth, pointed out in my claim and illustrated in the accompanying drawings, in which—

Figure 1 shows a side elevation of a bracket for current conducting wires embodying my invention mounted on a suitable support. Fig. 2 shows an end elevation of the same, showing the inner side or edge thereof, part of the bracket adjacent to the notch being cut away.

My improved bracket for current conducting wires includes a body which I have indicated in the accompanying drawings by the reference numeral 10. The upper end of the bracket is preferably round and is provided with screwthreads 11 for mounting ordinary glass insulators used with telephone, telegraph or light wires and the like. The lower portion of the bracket is angular and one side thereof 12 is beveled as shown in Fig. 1. The lower end of the body is considerably narrower than the upper end of the beveled portion thereof, so that when the beveled end or side 12 is placed adjacent to a post 13 or other suitable support, the screwthreaded upper end of the bracket will extend upwardly and outwardly from the post at an acute angle thereto. In the lower portion of the body 10 I provide openings 14 for the reception of bolts or the like for attaching my bracket to a support.

The parts just described are of the ordinary construction used for such brackets and do not in themselves form my present invention.

It may be seen that the upper side of the body 10 and the support to which said body is secured form a V having a sharp lower end. It has been found by long experience that a wire being drawn over the bracket between the bracket and post, while the wire is being drawn taut preparatory to securing it to the glass insulators, drops into the V above described, where the friction is great, and it is then difficult to draw the wire over the bracket. In cases where the wire has been spliced and a knot or splice is formed therein, the splice is caught in the V and can not be passed until a lineman has climbed the pole and lifted the splice above the bracket to let it slide through the V. The releasing of the spliced portion requires a considerable amount of time and the tendency of such portions to catch in the V causes a great deal of inconvenience in stringing electricity conducting wires. It is believed that no practical means has heretofore been devised for removing this difficulty.

For doing away with the difficulties described, and enabling the wire to slide smoothly over the bracket while being strung, and especially for permitting spliced portions to slide freely over the bracket, I have provided the following means: In the upper inner surface of the body 10 at a point near where the upper portion of the beveled edge rests against a post or the like, I have cut a comparatively deep notch 15 which is semi-circular in form as shown in Fig. 1. At each end of the notch I have cut away the portions of the body 10 adjacent to the notch at 16 thereby forming a rounded edge 16 over which the wire 17 may be freely drawn with a minimum of friction, especially when the wire contains a splice 18.

The importance and advantage of my improved bracket may be understood from the above descriptions, and from the inconveniences and difficulties it enables me to avoid in stringing wires.

I claim as my invention:

A bracket having a portion of one of its sides over the lower portion of its length beveled and designed to be secured to a support so that the upper end of said bracket is extended outwardly and upwardly at an acute angle from said support, said bracket having a round notch formed in its upper surface above and near the upper end of said beveled portion.

Des Moines, Iowa, July 26, 1912.

ARIE KLEINHESSELINK.

Witnesses:
P. D. VAN OOSTERHAUT,
JOHN SCHOLTEN.

Copies of this patent may be obtained for five cents each, by addressing the "Commissioner of Patents, Washington, D. C."